June 24, 1969  D. M. FRANKLIN  3,451,363
LINER CONSTRUCTION FOR INCINERATORS
Filed June 26, 1967  Sheet 1 of 2
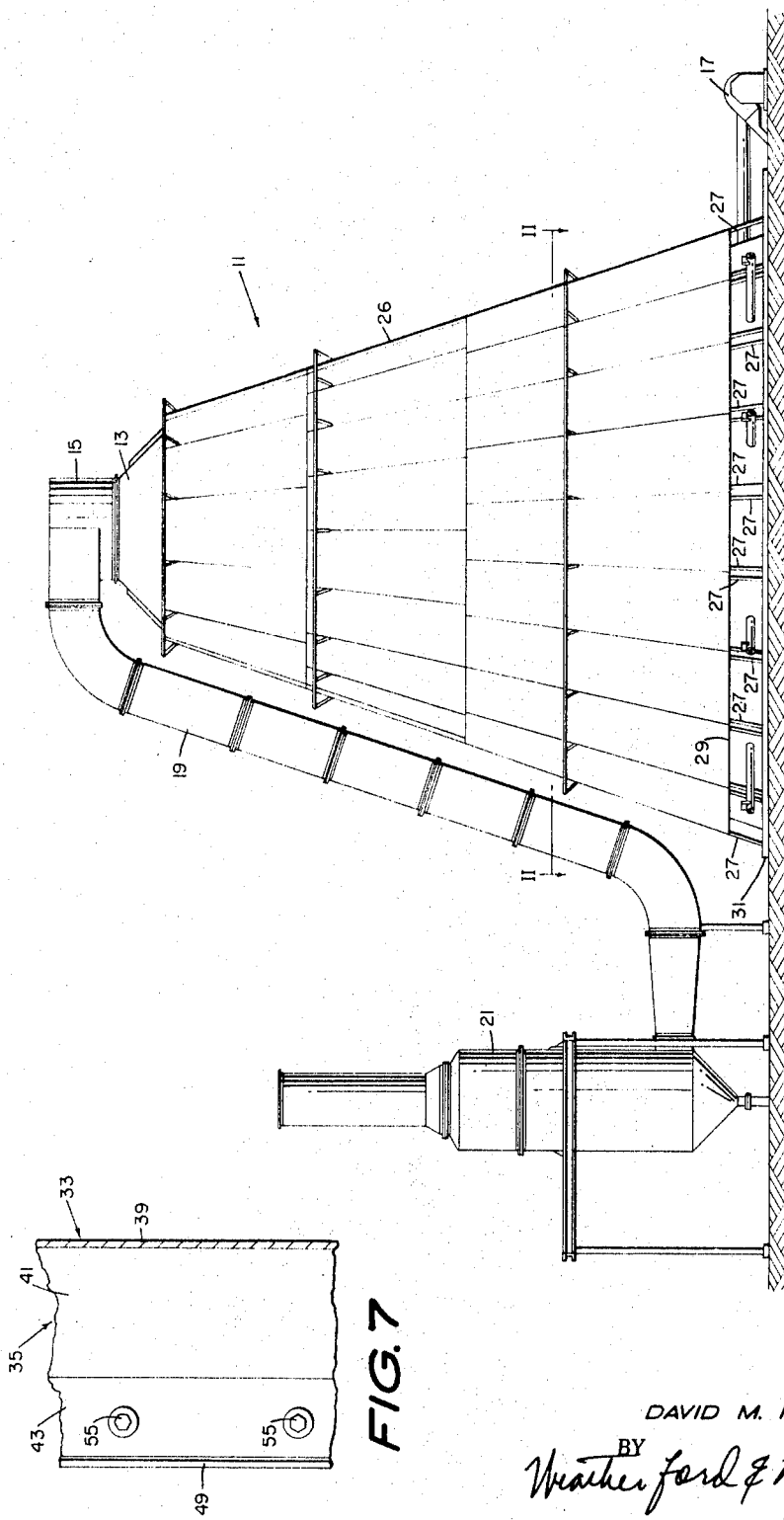
INVENTOR,
DAVID M. FRANKLIN
BY
Weatherford & Weatherford
Attys

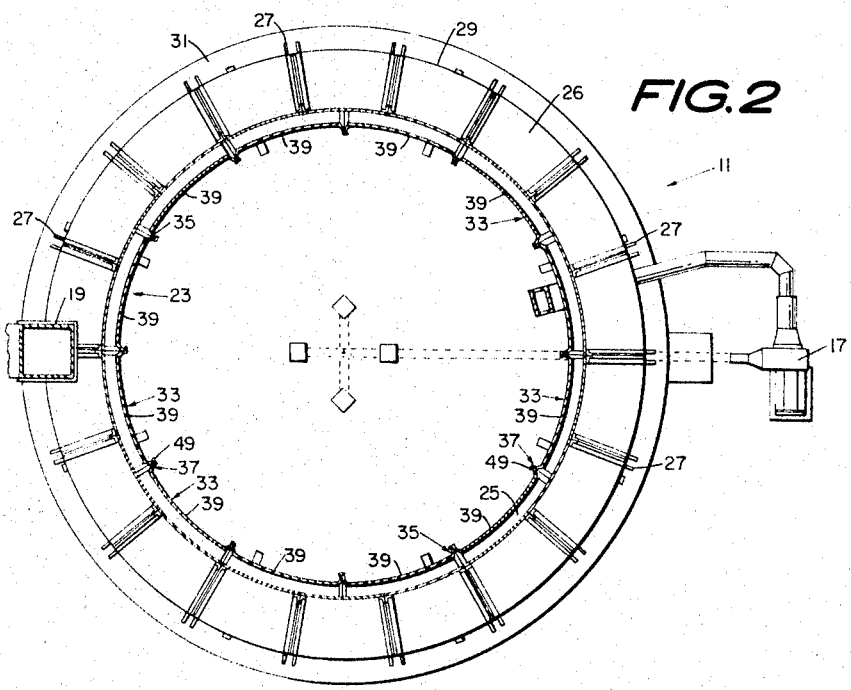
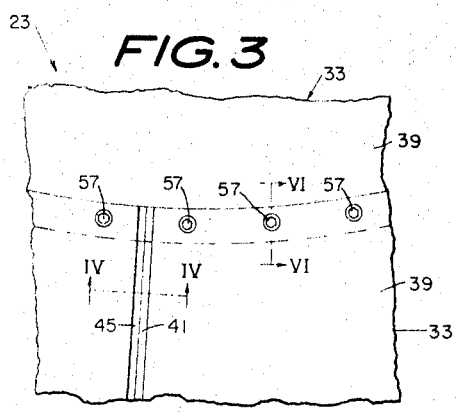
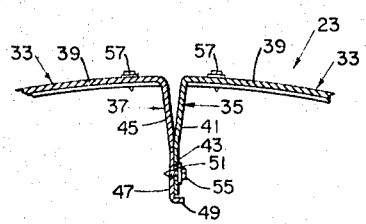
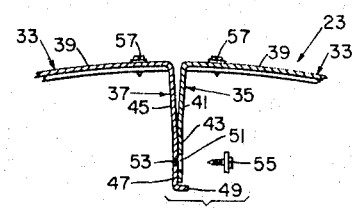
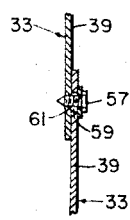

United States Patent Office 3,451,363
Patented June 24, 1969

3,451,363
LINER CONSTRUCTION FOR INCINERATORS
David M. Franklin, Memphis, Tenn., assignor to Steelcraft Corporation, Memphis, Tenn., a corporation of Tennessee
Filed June 26, 1967, Ser. No. 648,739
Int. Cl. F23g 7/00, 5/00
U.S. Cl. 110—18                5 Claims

ABSTRACT OF THE DISCLOSURE

A liner for an incinerator, formed of a series of curved heat expansible and contractible plates, each plate being flanged at its terminal edge and joining the next adjacent plate, with the flanges of adjacent plates being yieldably secured together to allow the liner to expand and/or contract undistorted under changes in temperature.

BACKGROUND OF INVENTION

Field of invention

This invention relates to new and useful improvements in incinerators and like combustion devices, and more particularly to the inner liner construction thereof. This invention further relates to means for providing substantially expansible inner liners for incinerators to permit these inner liners to expand pursuant the heating thereof without distortion or alteration of the basic structural form of the incinerator.

The present invention provides expansible and contractible flange means in combination with secure but non-rigid fastening means to maintain the separate plates of the inner liner in substantially distortion-free condition to minimize resulting buckling and material fatigue.

Description of the prior art

There have been numerous prior devices but these prior devices have been provided with inner liners comprising plates and other like components substantially rigidly connected to each other depending upon the materials comprising the plates for expansion and contraction induced therein by the heat of combustion in the combustion chamber of the incinerator. These rigidly connected prior devices have additionally been subject to material fatigue and strain causing structural distortion and buckling of the inner liner component plates resulting from repeated heating and cooling of the inner liner of the incinerator.

A search of the prior art disclosed the following references: 1,886,760, M. J. Tierney, Nov. 8, 1932; 2,863,406, K. G. Anderson, Dec. 9, 1958; 2,984,235, K. S. Johnson, May 16, 1961.

The field of search was: Class 110, Sub-class 18; Class 126, Sub-class 119.

Summary of the invention

The present invention provides an incinerator of substantially conical configuration having an outer skin and an inner liner with an air chamber interposed therebetween. The present invention further provides the inner liner component plates with angularly deformed flanged ends and means for attaching the several plates at the angularly flanged ends by fastening means inserted in lost motion devices to provide undistorted expansion of the several plates of the inner liner upon transmission of heat thereto from a source of combustion within the combustion chamber of the incinerator inwardly adjacent the inner liner thereof.

Objects

The principal object of the present invention is to provide an inner liner for an incinerator comprising a plurality of arcuate plates.

Another object of the present invention is to provide end flange means for the arcuate plates of an inner liner of an incinerator.

A further object of the present invention is to provide fastening means in combination with lost motion means for the attachment of the plates of the inner liner of an incinerator, and Another object of the present invention is to generally improve the design, construction and efficiency of inner liners for incinerators.

Description of drawings

The means by which the foregoing and other objects of the present invention are accomplished and the manner of their accomplishment will be readily understood from the following specification upon reference to the accompanying drawings, in which:

FIG. 1 is a side elevational view of an incinerator incorporating the device of the present invention.

FIG. 2 is a transverse cross-sectional view of the device of FIG. 1 as taken on the line II—II of FIG. 1.

FIG. 3 is an enlarged fragmentary side elevational view of the device of FIG. 1.

FIG. 4 is a fragmentary cross sectional view of the device of FIG. 3, as taken on the line IV—IV of FIG. 3 illustrating the device in contracted condition.

FIG. 5 is a fragmentary partially exploded cross sectional view of the device of FIG. 4 illustrating the device in expanded condition, and FIG. 6 is a fragmentary vertical cross sectional view of the device of FIG. 3 as taken on the line VI—VI of FIG. 3.

FIG. 7 is a further enlarged fragmentary side elevational view of one flange of the device of FIG. 3.

Description of the preferred embodiment

Referring now to the accompanying drawings in which the various parts are indicated by numerals the present invention comprises a substantially conical incinerator 11 provided with a truncated conical dome 13 affixed to the top thereof and a dome cap 15 rigidly secured to the top of the dome 13. The present invention additionally comprises fan means 17 for introducing pre-warmed air into the interior of the incinerator 11, duct means 19 communicatingly connected to the dome cap 15 and extending downwardly away therefrom to a scrubber 21 for the exhaustion therethrough of gases and vapors emanating thereinto from the interior of the incinerator pursuant the combustion of burnable materials therein.

The incinerator 11 is further provided with a substantially conical inner liner 23 concentrically alined with the incinerator 11 and spaced circumferentially inwardly thereof to form an air chamber 25 between the external shell 26 of the incinerator 11 and the inner liner 23. The external shell 26 of incinerator 11 is rigidly mounted upon a plurality of support members 27 rigidly attached to the peripheral rim 29 thereof, extending radially downwardly therefrom to support the external shell 26 of the incinerator 11 upon a base 31 maintaining the rim 29 in spaced relation thereabove to provide means for the ingress of the air external the incinerator below the rim 29 into the air chamber 25.

The inner liner 23 of the incinerator 11 comprises a series of arcuately formed plates 33 provided with flanged edge portions 35, 37 substantially coextensive in length with the body portion 39 of the plates 33. The flanged edge portions 35 comprise an intermediate portion 41 integrally attached to one of the sides of the body portion 39 of the plate 33 extending angularly away therefrom, and a terminal strip 43 attached to the intermediate portion 41 extending obtusely angularly from the intermediate portion 41.

The flanged edge portions 37 comprise an intermediate portion 45, similar to the intermediate portion 41 of the flange 35, integrally connected to the edge of the plate 33 opposite the edge attached to the flange 35 extending angularly away from the edge of the plate 33. The flange 37 is provided with a terminal strip 47 attached thereto, similar to the terminal strip 43 of the flanged edge portion 35, extending obtusely angularly of the intermediate portion 45, and a flap 49 in coextensive attachment with the terminal strip 47 extending substantially perpendicularly away therefrom.

The present invention is additionally provided with a plurality of longitudinally alined, spaced apertures 51 formed in the terminal strip 43 of the flanged edge portion 35, and a like plurality of somewhat smaller threaded orifices 53 formed in the adjacently abutting terminal strip 47 of the flanged edge portion 37. The present invention is further provided with threaded fastening means 55, as bolts or the like, for insertion through the apertures 51 into threaded engagement with the threaded orifices 53 to substantially maintain the terminal strips 43 and the adjacently abutting terminal srips 47 in substantially yieldable engagement.

It will thus be readily seen that when a predetermined number of plates 33 are interconnected at their flanged ends as by the bolt means 55, a substantially truncated conical configuration is described. A similar somewhat smaller truncated cone is affixed above the established conical configuration as by a plurality of threaded means 57, inserted through a like plurality of annularly spaced apertures 59 carried by the lower conical configuration and are in substantially threaded engagement with a like plurality of circumferentially alined radially spaced threaded orifices 61 formed in the smaller upper truncated cone. It will be further seen, upon reference to the foregoing specification and the accompanying drawings that successive truncated cones may be added in tiered relation until the desired resultant frusto-conical inner liner 23 is achieved.

It will be further observed that when the terminal strips 43 are in side to side abutment with the terminal strips 47 and attached thereto as by the bolts 55, the flaps 49 of the terminal strips 47 overlie and extend beyond the distal ends of the terminal strips 43 to form a substantially snug air shield. The flaps 49 additionally provide stop means for limiting the transverse movement of the flange pursuant changes in temperature in the plates 23 and the flanges 35, 37.

It will thus be readily seen upon reference to the foregoing specification and the accompanying drawings that the plates 33 of the inner liner 23, expanding transversely as by the heat acquired thereby from the combustion within the chamber inwardly adjacent the inner liner 23, decrease the angularity between the intermediate portions 41 of the flanges 35, 37 allowing the plates 23 to expand laterally undistortedly. Then undistorted vertical expansion of the plates 23 is accomplished by the vertical movement of the bolts 55 within the somewhat larger apertures 51 of the strips 43, and a similar vertical movement of the bolts 57 within the somewhat larger apertures 59 of the inwardly adjacent plates 23 of the superjacently affixed tier of plates.

It will further be noted that the expansion and contraction of the plates 23 is compensated for by the reciprocal increase and decrease of the angular attitude of the intermediate portions 41, 45 and the reciprocatory shifting of the bolts 55 in the apertures 51, and the shifting of the bolts 57 within the apertures 59 of the plates 23.

It will be understood that while the interconnecting flanges of the inner liner are shown and described as extending into the combustion chamber inwardly from the liner plates, such flanges may be extended outwardly away from the liner plates to project into the air space between the inner liner and the outer shell, without departing from the present invention, and within the scope of the appended claims.

I claim:
1. An inner liner construction for an incintrator, said incinerator including an outer shell and means supporting the lower edge of said outer shell to provide air access within said outer shell, said inner liner
   (A) being spaced inwardly from said outer shell and said liner and said shell defining a heat-dissipating air space therebetween,
   (B) comprising a plurality of mating arcuate plates interconnected to complete said liner,
   (C) said arcuate plates at their respective opposite edges including flanges extending from said plates,
      (1) said flanges of adjacent said plates being fastened together at points spaced from said plates to comprise said interconnection,
      (2) each said flange being angularly disposed relative to its related said plate and being substantially coextensive in length with the length of its related said plate,
      (3) the junction of each said flange to its related plate being spaced from the flange junction with the next adjacent plate,
      (4) at least one of the adjacent flanges including a laterally extending flap coextensive in length with said one flange, overlying the innermost part of said flanges, shielding the flanges against intrusion of undesired material,
      (5) said flanges being resilient and heat responsive to permit expansion and contraction of said liner, the interconnection of said flanges maintaining said liner in substantially constant spaced relation with said shell without disruption,
   (D) and means connecting said inner liner to said outer shell.

2. An inner liner construction in accordance with claim 1, in which the fastening between adjacent flanges is a lost motion connection to permit relative inward and outward movement of said flanges and plates under the influence of the heat of said incinerator.

3. A construction in accordance with claim 2, in which said flap of said one flange overlaps the other of said flanges to provide stop means for limiting the lost motion movement relatively between said flanges.

4. A construction in accordance with claim 2, in which each adjacent flange includes a terminal strip disposed at an obtuse angle to its related flange and mating against the strip of the adjacent flange, said lost motion connection means being carried by said strips.

5. A construction in accordance with claim 1, in which the flap is carried by the flange in which the attachment means is connected and extends across the edge of the other flange, which other flange is slotted.

References Cited
UNITED STATES PATENTS

| | | | |
|---|---|---|---|
| 1,199,403 | 9/1916 | Middaugh | 110—7 |
| 1,496,900 | 6/1924 | Mitchell | 110—18 |
| 1,605,513 | 11/1926 | Connery | 52—573 |
| 1,886,760 | 11/1932 | Tierney | 110—18 |
| 2,863,406 | 12/1958 | Anderson et al. | 110—18 |
| 2,871,803 | 2/1959 | Wesp | 110—18 |
| 2,984,235 | 5/1961 | Johnson et al. | 126—119 |
| 3,245,179 | 4/1966 | Hawkins | 52—573 XR |

CHARLES J. MYHRE, *Primary Examiner.*

HARRY B. RAMEY, *Assistant Examiner.*

U.S. Cl. X.R.

110—56